United States Patent Office 3,263,165
Patented July 26, 1966

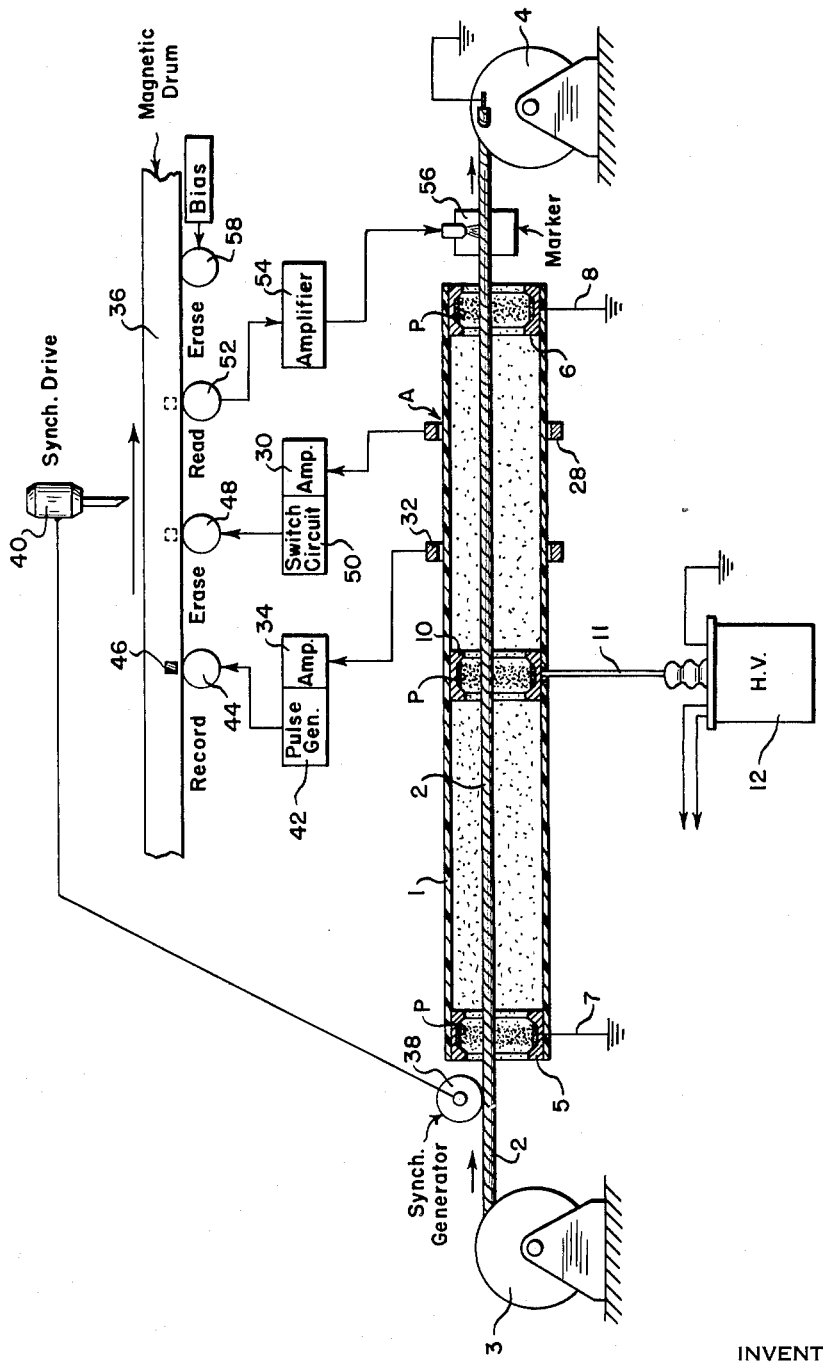

3,263,165
APPARATUS AND METHOD UTILIZING NON-CONDUCTIVE TUBE MEANS CONTAINING AN IONIZED GAS FOR CORONA TESTING OF INSULATED ELECTRICAL CABLES
David Eigen, Passaic, N.J., assignor to The Okonite Company, Passaic, N.J., a corporation of New Jersey
Filed Oct. 16, 1962, Ser. No. 230,807
5 Claims. (Cl. 324—54)

My invention relates to the testing of insulated electric cables or wires (hereinafter called "cables") with particular reference to the detection of corona-producing elements in the insulation. This invention is an improvement over the apparatus of my Patent 3,047,800, granted July 31, 1962, and provides an improved apparatus and a method of detecting individual corona-producing elements (hereinafter called "defects") in the insulation of insulated electric cables.

Gaseous areas exist in most insulations, and some are so minute that they go unobserved. Nevertheless, electrical discharge across these gaseous areas can occur when the dielectric is under high enough voltage stress. This condition can lead to destruction of the insulation from electronic bombardment and chemical deterioration. Such imperfections in the insulation are a major cause of failure in higher voltage cables and since the evidence is destroyed during the power surge at time of failure the precise nature of the defect is usually unknown.

This invention provides means for utilizing the electrical discharge in a gas inclusion within the cable insulation under predetermined stress levels to indicate the location of the inclusion.

This invention comprises the passing of an insulated conductor cable through a non-conducting tube containing a semi-conducting ionized gas resulting from alpha radiation, or its equivalent, in which there is a linear voltage gradient from a maximum high voltage to zero voltage by means of which high-frequency signals, generated by corona at the point of a defect, are transmitted through the non-conducting tube to receiving and amplifying means to locate the defect in the insulation. Electrically excited probes are located exterior of the tube to determine the corona at several voltages, both as a function of the starting voltage on the incoming side of the high voltage, as well as extinction voltages on the outgoing side of the high voltage. Extraneous or spurious signals may be encountered during testing and probe means are used which can cancel out these signals to permit only the corona from the gas ionized in an insulation defect to actuate the locating means.

As a source of alpha radiation it is advantageous to use high density Polonium 210. The gas in the tube is ionized by the radiation and is made semi-conducting to the amount desired, depending on the density of the material producing alpha radiation. Alpha radiation ionizes the gas (preferably air) to which it is directly exposed, and since this form of radiation does not penetrate to any extent the thinnest membrane the air surrounding the cable is made semi-conducting by any amount desired. The density of the material coating the insulated tube is chosen so as to insure ionization of all gas in the cross-section of the tube, but low enough to limit the draining of excess current from the high voltage through the longitudinal direction of the tube. In a preferred construction three electrodes are mounted in the tube, one being in the longitudinal center to which a high voltage transformer is connected and one at each end which is grounded as is also the transformer. On each of these electrodes Polonium 210 is applied and secured in a protected position. The density of the Polonium 210 on the three electrodes is high enough to insure adequate radial coupling to the high, and low sides of the transformer. Thus, a linear voltage gradient may be established by means of the semi-conducting gas resulting from alpha radiation, and since alpha radiation does not penetrate the walls of cable insulation, internal gas inclusions are not ionized, except when stressed sufficiently by the high voltage of the test.

The apparatus of the invention comprises a non-conducting tube, formed for example of plastic, glass reinforced plastic or even of glass which is open at its ends for the free entry of air or other gas and the passage of the insulated cable. Metal rings are provided at the ends of the tube for electrical connections to ground and at the center for connection to the high voltage transformer. Preferably annular grooves are formed in the rings for securing the Polonium 210 to ionize the air in the tube. It is important to apply the Polonium 210 on the metal means at the end and at the center for the purpose of insuring a positive conducting path from the transformer to the ground connections.

At suitable spaced intervals at the exterior of the tube and on either side of the transformer connection, on either or both the incoming side or the outgoing side, two or more detection probes are located and are connected to amplifier and recording and/or marking means as illustrated in my said patent. One important feature of the invention is the provision of means for passing the insulated cable through the detection system in a straight line without bending the cable.

The accompanying drawing illustrates an arrangement of apparatus for carrying out the invention.

The apparatus illustrated in the drawings comprises a cylindrical tube 1 formed of non-conducting material such as a thermosetting resin reinforced with glass fibers. This tube may vary in diameter, say, from 1" to 5" and in length from 5' to 20'. The insulated cable 2 is passed continuously at a uniform rate from the let-off reel 3 through the tube 1 in a straight line to the take-up reel 4.

At the entering end of the tube a metal ring electrode 5 is mounted and at the exiting end of the tube a metal ring electrode 6 is mounted and these electrodes are connected to ground by wires 7 and 8 respectively which are inserted through the tube. At the approximate center of the tube an intermediate metal ring electrode 10 is mounted and this ring is connected through a hole in the tube by wire 11 to a high voltage transformer 12 which is connected to a 60 cycle power line (not shown) and is capable of secondary voltages varying from 300 volts to any desired upper voltage to correspond to the voltage intended to be used for the cable being tested. The other end of the secondary circuit is connected to ground.

At suitable places within the tube at least three areas of Polonium 210 are attached. In order to protect the Polonium 210 from injury or displacement by the moving cable, it is advantageous to provide annular grooves in the electrodes 5, 6 and 10 and to secure therein a layer P of Polonium 210 which is out of physical contact with the insulated cable 2. As is customary the exterior surface of the Polonium 210 is protected by a thin sheet of gold. The Polonium 210 emits alpha rays which ionize the air or other gas within the tube (represented by the dots) and this provides a path for the flow of current from the high voltage of electrode 10 to the grounded electrodes 5 and 6 where the voltage is substantially zero.

The transformer may be operated at any suitable frequency, advantageously from a 60 cycle power line, although much higher frequencies may be used, and if there are any defects in the insulation which are ionized at the applied voltage, pulses are generated and it is these pulses from this ionization that are picked up by the probes.

As the cable 2 is passed from the reel 3 through the ionized gas in tube 1, any corona-producing defect will be electrically stressed, the stress rising from zero at the entering end of tube 1 until it reaches a maximum at the place where the defect is within the electrode 10. At some point in the travel of the defect from the entering end to electrode 10, corona will occur in the defect if the voltage delivered by the transformer is sufficiently high and will continue until the defect has passed far enough beyond the electrode 10 for the stress on the walls of the defect to have dropped to corona-extinction value. If corona is not indicated when the defect reaches the point A in the tube, then the testing apparatus will react as if no corona had been formed. The location of the point A, it will be understood, corresponds to the corona level prescribed by the specification of the cable being tested. If, however, corona is present when the defect reaches point A, it will be detected by a pick-up ring 28, which is provided around the tube 1 at point A. An amplifier 30, connected to the pick-up ring 28, amplifies the disturbance emanating from the corona, which is discharged at high random frequency.

To separate an indication of corona from spurious responses from interference, due to operations in a plant where the tests are being run, for example, I have provided an apparatus, illustrated in the drawing, whereby the cable is tested twice during one pass. Intermediate the electrode 10 and pick-up ring 28, I provide a pick-up ring 32. This pick-up ring 32 is connected to an amplifier 34 and arranged to indicate when corona exists in a defect passing that ring. It then remains to wait until the defect reaches the ring 28. If at that instant amplifier 30, connected to ring 28, indicates that corona persists, it is indicative that the indication from amplifier 30 is truly of a corona.

In the apparatus illustrated a magnetic drum 36 is employed to record and interpret the output of the two amplifiers 30 and 34 of the pick-up rings 28 and 32, respectively. The drum 36 need not be physically a drum, as it could be a disc or an endless belt of the material used in tape recorders. The drum 36 is arranged to travel at a speed in constant ratio to the speed of the cable 2, which moves in contact with a pulley attached to the shaft of a synchronous generator 38, the output of which is employed to drive a synchronous motor 40, mechanically connected to the drum 36.

The output of the amplifier 34 for the pick-up ring 32 is utilized to record on the drum 36 through the recording head 44 or to cause operation of a pulse generator 42, the generated pulses of which are recorded on the drum 36 through the recording head 44. This record has been indicated in the drawing as a small black rectangle 46. It will be understood, therefore, that a series of records, such as 46, will appear on the drum 36, one for each corona occurring within the ring 32, and also one for each spurious signal put out by the amplifier 34 in response to interference, should there be any.

The output of the amplifier 30 for pick-up ring 28 is utilized to preserve the record 46 if corona exists when the point of the cable corresponding to the record reaches point A. If no corona exists at point A, either because of the voltage stress at this point is too low or because record 46 is spurious, viz., caused by interference, which, it will be understood, is only momentary, the record is to be erased. This is readily done by supplying an erase head 48, properly spaced from the recording head 44. This erase head normaly erases everything which comes to it, except when the amplifier 30 is activated by corona existing within the ring 28 or by a second spurious signal. A switch circuit 50 de-activates the erase head 48 whenever the output of the amplifier 30 is indicative of corona.

Those records 46 which are preserved on the drum 36 then pass to a reading head 52, the output of which, amplified by amplifier 54, operates a suitable marker 56 to make a physical indication on the surface of the cable insulation at the location of a defect in which corona persisted while the defect was at point A. This marker can take any convenient form, as a spray gun, for example, and the physical indication or mark can be directly over the defect or at any predetermined distance therefrom.

An erase head 58 removes all records from the drum 36 after these records have activated the reading head 52 and the marker 56.

From the above it can be seen that all records produced by the head 44 are erased, whether indicative of corona or spurious corona, unless a signal occurs in amplifier 30 at exactly the right time to be very probably a result of corona. Spurious signals from amplifier 30 do no harm unless a record 46 is in exactly the right position opposite the erase head at the time of their occurrence, which is unlikely.

By employing a plurality of rings 28, spaced longitudinally of the tube 14, each for a different voltage, several corona tests for as many different voltages as there are pick-up rings can be run simultaneously. Record head 44 is then arranged to produce a multiplicity of records 46, one for each ring 38, on separate channels on record element or drum 36. The erase head 48 for the first-to-be-reached ring 28 is arranged to cover all of the records across the width of record element 36, the next all but one, and so on. Instead of a single multi-channel reading head, a series of single-channel heads may be employed, each channel of each head being connected to a separate marker.

Probe elements similar to 28 and 32 may be mounted around the tube 1 at convenient places between electrodes 5 and 10 and these probes may be connected to amplifying and recording or marking apparatus similar to that connected to probes 28 and 32 to determine and evaluate any information desired.

In addition to furnishing information which could be termed a profile of the defects encountered, the multiplicity of successive readings, each depending upon the one before, would reduce to the vanishing point the probability of spurious indications appearing on the cable.

Inasmuch as certain types of cable to be tested are expensive to repair, or whether it may be desired to install a cable in a location where it is difficult and expensive to repair it, it becomes necessary that, in testing such cables, every precaution be taken to preclude spurious indications of corona-producing defects. The apparatus I have described has inherent interference suppression, since a spurious signal must appear in proper sequence and repeat at exactly spaced intervals to be confused with corona, and, as above pointed out, the number of pick-up rings may be increased, thereby enhancing selectivity.

It will be seen from all of the foregoing that I have provided apparatus for the corona-testing of the insulation of electric cables whereby any deleterious gas defects in the insulation may be detected and their position within the insulation accurately determined, thereby facilitating repairing of the cable if that be necessary.

It is to be understood that changes may be made in the details of construction and arrangement of parts above described within the purview of my invention.

I claim:

1. Apparatus for corona-testing of insulated electric cable which comprises an elongated tube of non-conducting material for maintaining a gas therein, said tube having open cable-entering and cable-existing ends, means for passing an insulated electric cable through the tube, a metal electrode inside the tube intermediate the tube ends, another metal electrode near each end of the tube, means for applying a high-voltage alternating current to the intermediate electrode, said electrodes at the ends of the tube and the cable being grounded, means in the tube for ionizing the gas by means of alpha radiation, whereby there is within the tube a maximum voltage near the intermediate electrode with progressively decreasing voltages to the end electrodes where the voltage is practically zero, whereby the passing insulated cable is electrically stressed progressively, a first probe located exterior of the tube and spaced between the intermediate electrode and the electrode at the cable exiting end of the tube which is excited by high-frequency signals generated by corona-producing defects in the insulation, an amplifier for said probe which receives energy signals from said probe, means connected to the amplifier to indicate the presence of the defect in the insulation, means operatively connected to the first probe to record signals when the cable passes the first probe, a second probe exterior of the tube and located between the first-mentioned probe and the cable exiting end of the tube and where the stress on the insulation is less than the stress on the first probe, means operatively connected to the second probe to erase the record if no corona occurs when the defect reaches the second probe, and means connected to the second probe to indicate a defect if corona be present when the defect passes the second probe.

2. Apparatus according to claim 1 wherein said means to record signals comprises a recording tape that is mounted for movement in synchronism with the cable and that is operatively connected to the amplifier to record on the tape the presence of a defect on the insulation, and wherein said erase means is operatively disposed for erasing the record on the recording tape should no corona occur when the defect on the insulation reaches the second probe.

3. Apparatus for corona-testing of insulated electric cable which comprises an elongated tube of non-conducting material for maintaining a gas therein, said tube having open cable-entering and cable-exiting ends, means for passing an insulated electric cable through the tube, a metal electrode inside the tube intermediate the tube ends, another metal electrode near each end of the tube, means for applying a high-voltage alternating current to the intermediate electrode, said electrodes at the ends of the tube and the cable being grounded, means in the tube for ionizing the gas by means of alpha radiation, whereby there is within the tube a maximum voltage near the intermediate electrode with progressively decreasing voltages to the end electrodes where the voltage is substantially zero, whereby the passing insulated cable is electrically stressed progressively, a first probe located exterior of the tube and spaced between the intermediate electrode and the electrode at the cable existing end of the tube which is energized by ionized defects in the insulation, an amplifier for said probe, a pulse generator connected to the output of said amplifier, a recording head connected to said pulse generator, a magnetic recording device upon which the recording head records the presence of a defect in the insulation, which defect becomes ionized as it moves to said probe, means for moving said recording device in synchronism with the cable, a second probe about the tube positioned at a point where the stress on the insulation is lower than that at the first-mentioned probe, and an erase head operatively connected to the second probe for erasing the record on the recording device when the defect reaches the second probe should no corona occur at that instant at the defect.

4. The method of locating a defect in the insulation of an insulated electric cable that comprises:
advancing a cable, the conductor of which is at a reference potential, through a volume of an ionized gas that is contained within the bore of an electrically non-conductive tube that has a cable entering end and a cable exiting end;
maintaining within the tube an alternating current voltage that has a maximum voltage differential at a zone within the tube and a voltage progressively decreasing to said reference potential in both directions from the high voltage zone toward the ends of the tube, whereby a defect in the insulation can result in corona;
detecting electric corona impulses exterior of the tube at a point along its length intermediate the high voltage zone and the cable exiting end of the tube, and
utilizing the detected impulses to locate the defect.

5. The method of locating a defect in the insulation of an insulated electric cable that comprises:
advancing a cable, the conductor of which is at a reference potential, through a volume of a gas that is maintained in an ionized condition by continuous alpha radiation and that is contained within the bore of an electrically non-conductive tube that has a cable entering end and a cable exiting end;
maintaining within the tube an alternating current voltage that has a maximum voltage differential at a zone within the tube and a substantially linear resistance voltage gradient decreasing to said reference potential in both directions from the high voltage zone toward the ends of the tube, whereby a defect in the insulation can result in corona;
receiving electric corona impulses exterior of the tube by means of an electrode that is positioned exterior of the tube at a point along its length intermediate the high voltage zone and the cable exiting end of the tube;
amplifying the impulses;
separately receiving other electric corona impulses exterior of the tube at a second point along its length that is intermediate the first-mentioned electrode and the cable exiting end of the tube;
utilizing the amplified impulses received at the first point to indicate on a record member the apparent location along the length of the cable of the defect, and
erasing said indication on the record member if no corona is received when said location along the length of the cable passes said second point.

References Cited by the Examiner

UNITED STATES PATENTS

| | | | |
|---|---|---|---|
| 2,882,491 | 4/1959 | Gooding | 324—54 |
| 2,882,492 | 4/1959 | Gooding | 324—54 |
| 2,900,597 | 8/1959 | Gooding | 324—54 |
| 2,937,336 | 5/1960 | Gooding | 324—54 |
| 3,045,281 | 7/1962 | Skobel | 324—54 X |
| 3,047,800 | 7/1962 | Eigen | 324—54 |
| 3,096,478 | 7/1963 | Brown | 324—54 |

WALTER L. CARLSON, *Primary Examiner.*

G. R. STRECKER, *Assistant Examiner.*